United States Patent Office.

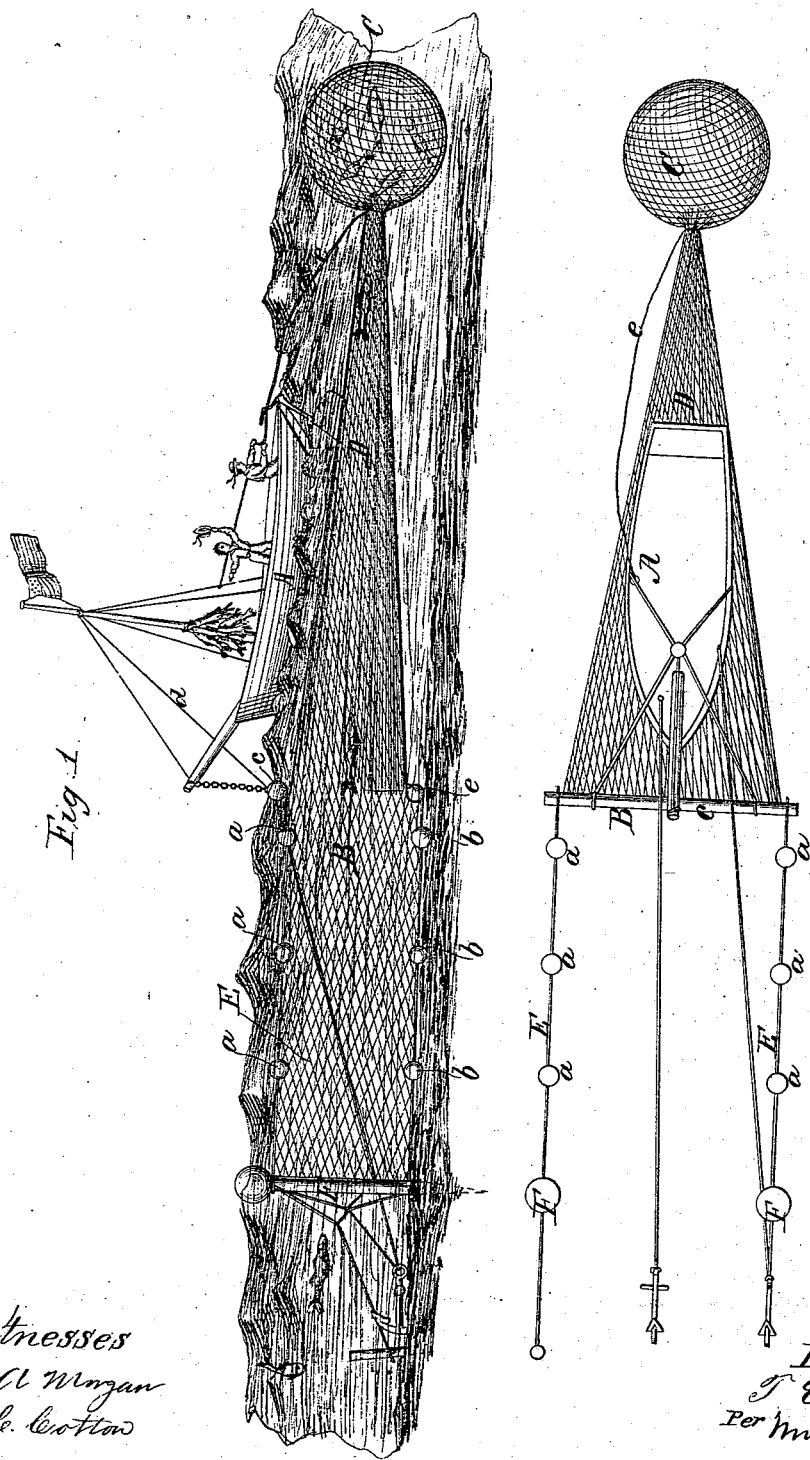

THOMAS CARTWRIGHT, OF DAVENPORT, IOWA.

Letters Patent No. 82,490, dated September 29, 1868.

---

IMPROVEMENT IN FISH-NETS.

---

The Schedule referred to in these Letters Patent and making part of the same.

---

TO ALL WHOM IT MAY CONCERN:

Be it known that I, THOMAS CARTWRIGHT, of Davenport, in the county of Scott, and State of Iowa, have invented a new and useful Improvement in Fishing with Set-Nets; and I do hereby declare that the following is a full, clear, and exact description thereof, which will enable others skilled in the art to make and use the same, reference being had to the accompanying drawings, forming part of this specification, in which—

Figure 1 is a side view of my invention.

Figure 2 is a plan or top view of the same.

Similar letters of reference indicate corresponding parts.

This invention relates to a new and improved application of a fyke or set-net with a boat or vessel, whereby the fyke or net may be set and raised with the greatest facility in a tide-way, and in localities where nets of this kind have not been hitherto used.

In the accompanying sheet of drawings A represents a vessel to which the fyke or net is applied, and B is the fyke or net, which is made similar to those in common use, C being the bag or receptacle which receives the fish, D the throat leading to the bag, and E E the wings which conduct the fish to the throat.

The vessel A is anchored in the desired spot, and the wings E E are secured in proper position by stakes F F, the wings extending a suitable distance in front of the boat, as shown in the drawing, the top of the wings being buoyed up by corks $a$, and the lower parts kept down by weights $b$, after the manner of a seine.

The front of the throat D is kept distended by transverse bars $c\ c$, and these may be drawn up, when necessary, by a rope, $d$, attached to the vessel.

When the vessel is anchored, and the wings E E of the net set, the throat and bag will be immediately carried under the vessel by the force of the current or tide, as shown in the drawings, and the net is set and ready for use.

The net is raised from time to time by drawing in the bag C, by means of a cord or rope, $e$, and raising the front part of the throat D by means of the rope $d$.

By this arrangement the net may be emptied of its contents and reset without any trouble or difficulty whatever.

Having thus described my invention, I claim as new, and desire to secure by Letters Patent—

The application of the fyke or net E D C to the boat in the manner described, that is to say, by means of the bow-cords $d$, attached to the transverse bars $c$, and the stern-cord $e$ attached to the bag C, as herein set forth and shown.

THOMAS CARTWRIGHT.

Witnesses:
ABNER DAVISON,
J. GOLDSBURY.